United States Patent [19]

Nasby et al.

[11] 3,854,082

[45] Dec. 10, 1974

[54] BATTERY CHARGING CIRCUIT

[75] Inventors: James S. Nasby; William L. Stelter, both of Skokie, Ill.

[73] Assignee: Master Control Systems, Inc., Skokie, Ill.

[22] Filed: June 7, 1973

[21] Appl. No.: 367,771

[52] U.S. Cl.......................... 320/22, 320/24, 320/39
[51] Int. Cl. .............................................. H02j 7/04
[58] Field of Search .............................. 320/22–24, 320/39, 40, 31, 32

[56] References Cited
UNITED STATES PATENTS

| 3,517,295 | 6/1970 | Lapuyade .......................... 320/23 X |
| 3,539,899 | 11/1970 | Dunlop et al. ..................... 320/40 X |
| 3,617,851 | 11/1971 | Dupuy et al. ...................... 320/39 X |
| 3,688,177 | 8/1972 | Reeves et al. ......................... 320/24 |

*Primary Examiner*—J. D. Miller
*Assistant Examiner*—Robert J. Hickey
*Attorney, Agent, or Firm*—Richard O. Gray, Jr.

[57] ABSTRACT

A battery charging circuit has means for supplying a battery under charge with a constant charging current until the voltage across the battery reaches a first predetermined voltage magnitude. A constant voltage means than applies a constant charging voltage equal in magnitude to the first predetermined magnitude until the current necessary to maintain it falls below a predetermined limit, at which time, a second constant voltage means supplies the battery with a constant final voltage of a magnitude lower than the first predetermined voltage magnitude. The final constant charging voltage is maintained unless the current at the output exceeds the predetermined limit. Therefore, during those times when the constant current or the first constant voltage is supplied to the battery, the battery is charged at a maximum rate until it is fully charged, at which time the second constant voltage source maintains the fully charged battery condition.

11 Claims, 4 Drawing Figures

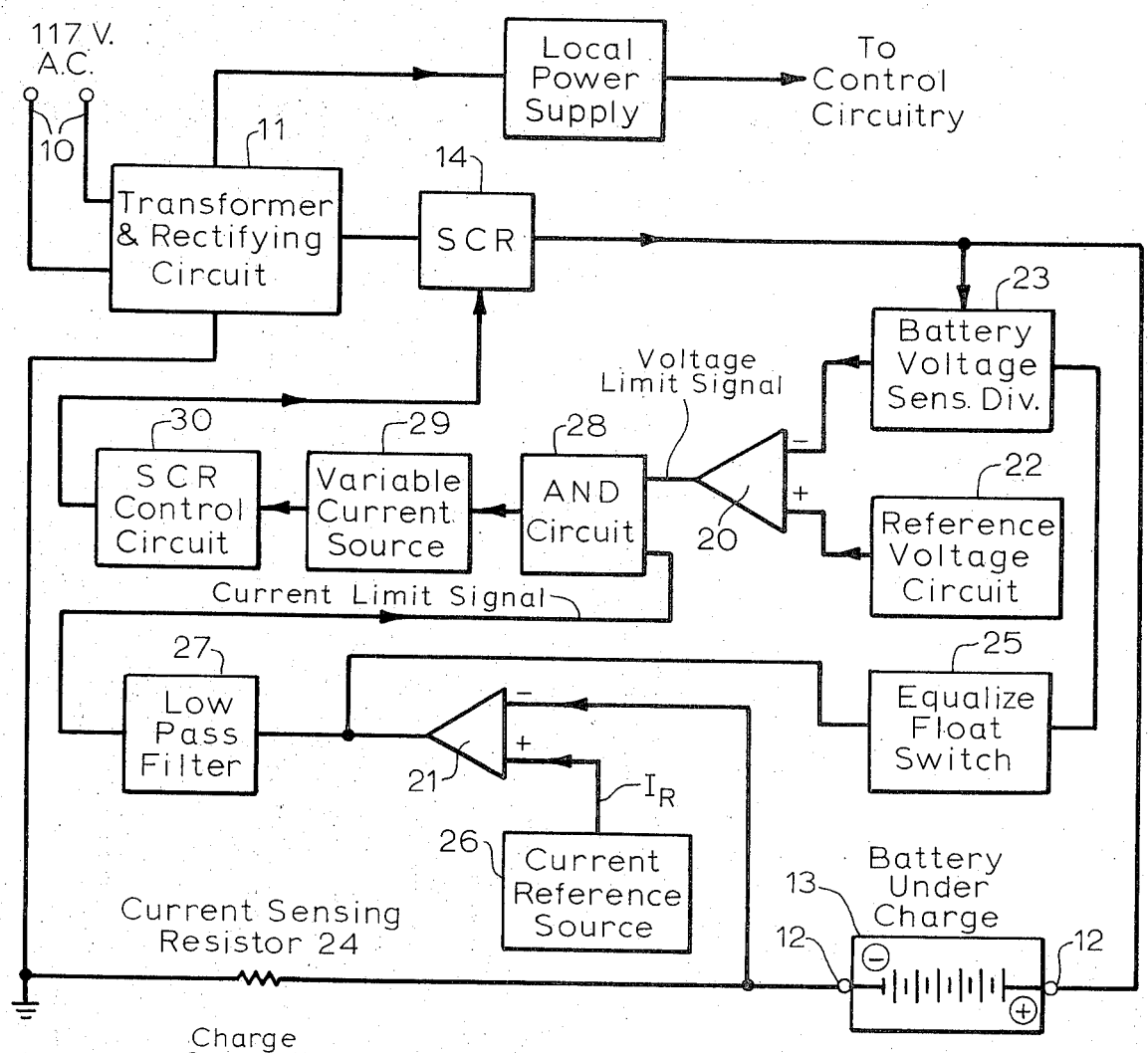
FIG.1
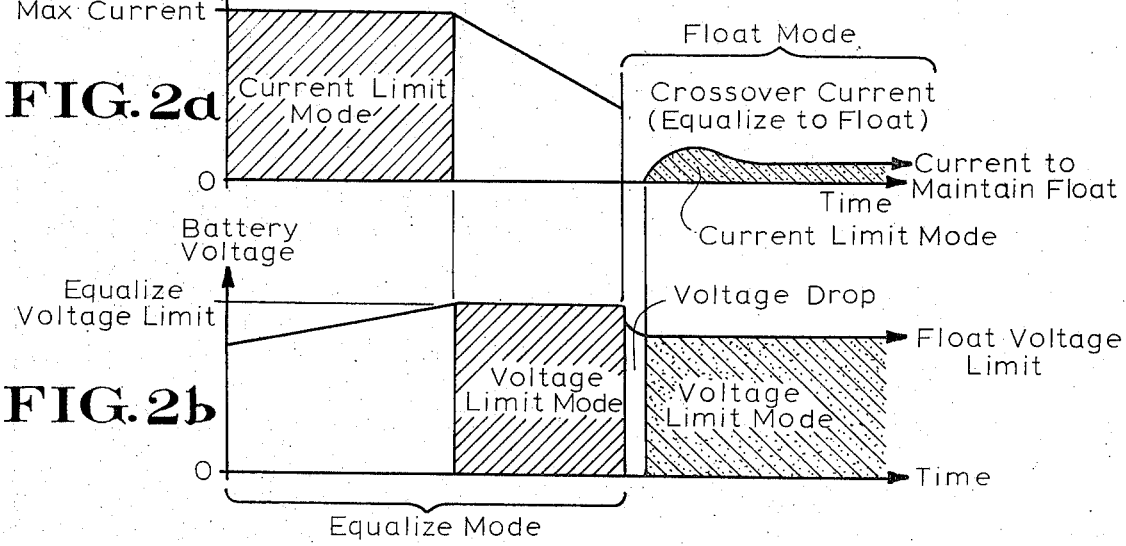
FIG.2a
FIG.2b

BATTERY CHARGING CIRCUIT

BACKGROUND OF THE INVENTION

With the growing popularity of portable electronic equipment, battery powered equipment has become increasingly popular. However, as well known, such batteries become discharged after a finite time of operation. In order to make such batteries suitable for future use, it is necessary to charge them.

While battery chargers of the prior art have been generally successful to this end, the charging process usually takes an excessive amount of time. Also, in an endeavor to decrease the amount of charging time, chargers have been devised to produce charging voltages and currents which exceed a certain maximum level thereby causing gassing within the battery under charge. Such is normally the case with the charging of lead-acid type batteries where over-voltage charging causes gassing and disintegration of the voltage elements.

In an endeavor to charge batteries in a minimum amount of time, prior art battery chargers have included charging circuits for applying a fixed amount of current and/or voltage to the battery under charge. Such chargers additionally include circuitry for maintaining the fully charged condition. While such chargers have been successful, they have incorporated manual adjustment between maximum charge and charge maintenance conditions. As a result, batteries charged by such circuits either don't become fully charged or are under maximum charge conditions too long creating gassing within the battery.

At times, it is particularly desirable to have a battery charging circuit which not only charges a battery but can be used as a power supply to supply power to the electrical equipment while the battery is under charge. This of course is desirable since it makes such chargers more useful from the standpoint of equipment downtime.

Therefore, it is a general object of the present invention to provide an improved battery charger.

It is a more specific object of the present invention to provide a battery charger which is capable of fully charging a discharged battery in a minimum amount of time.

It is a still more specific object of the present invention to provide a battery charging circuit which is capable of totally charging a discharged battery in a minimum amount of time while minimizing gassing within the battery.

It is still another particular object of the invention to provide a battery charging circuit which can be utilized as a power supply for supplying electrical power to electronic equipment while its battery is under charge.

SUMMARY OF THE INVENTION

The present invention provides a battary charging circuit comprising an input adapted to connnection to an external power source, an output adapted for connection to a battery to be charged, and means for supplying the output with a constant current until the output voltage reaches a predetermined charging voltage and means for supplying the output with a constant voltage equal to the predetermined charging voltage when the predetermined charging voltage is attained at the ouput. The battery charging circuit further comprises means for supplying the output with a constant final voltage when the current required to sustain the predetermined charging voltage at the output falls below a predetermined limit to maintain the battery in the fully charged condition.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 1 is a circuit diagram in block form of a battery charger embodying the present invention;

FIGS. 2a and 2b are representative wave forms showing charging current and charging voltage respectively as a function of time, which are helpful in understanding the operation of the system of FIG. 1.

DESCRIPTION OF THE PREFERRED EMBODIMENT

Figure 3:
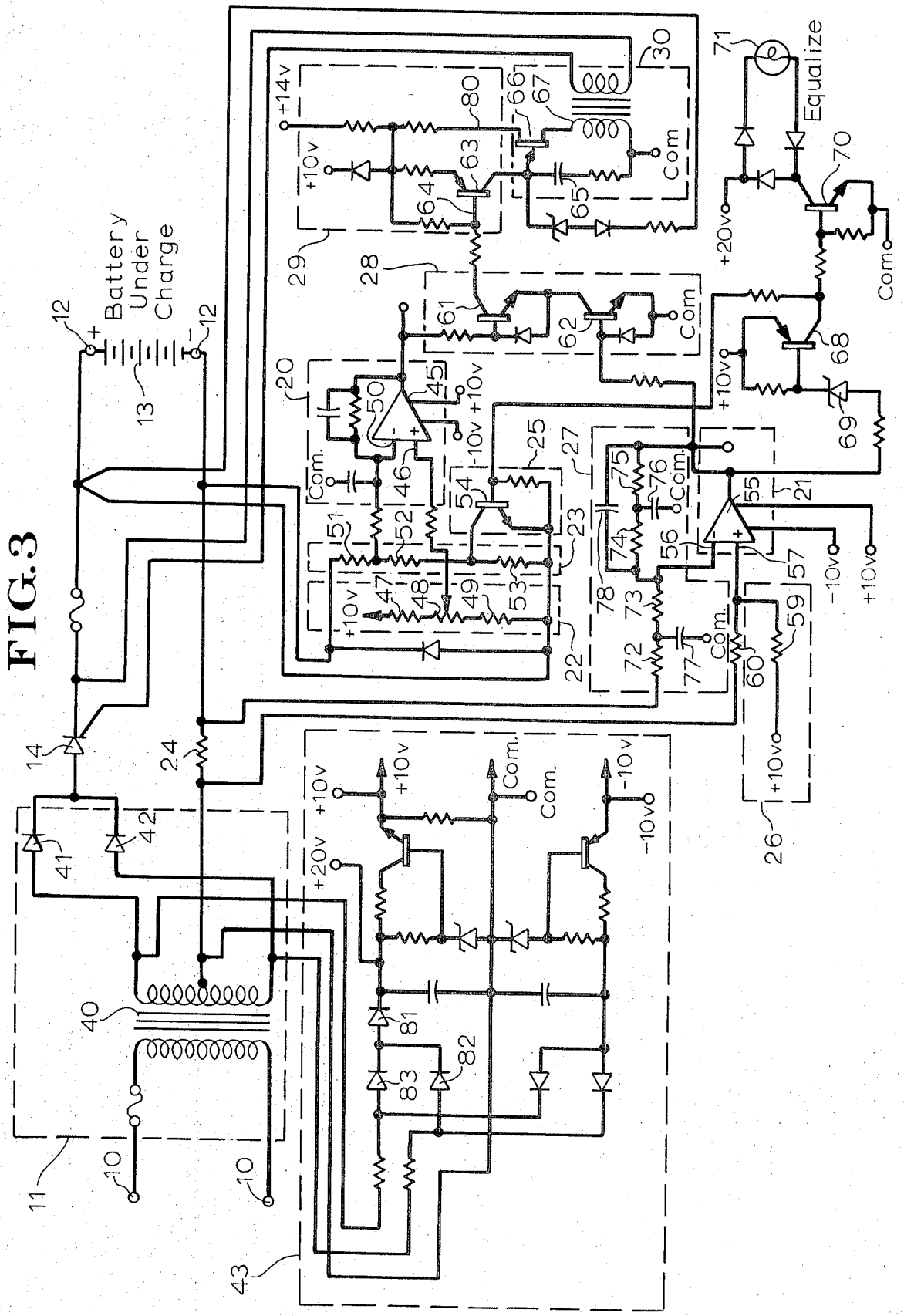
FIG. 3 is a detailed schematic circuit diagram of the preferred embodiment of the invention.

Referring now to the blocked diagram of FIG. 1, the charging circuit has input terminals 10 adapted for connection to an external AC source such as 117 volts AC. Rectifying circuit 11, including a transformer, transforms the alternating current at terminals 10 into a pulsating DC current. The battery charger of FIG. 1 additionally includes output terminals 12 adatpted for connection to a battery 13 to be charged. Silicon controlled rectifier 14 (SCR) is a switching device which switches the pulsating DC current from rectifying circuit 11 to control the amount of charging current and charging voltage supplied to output terminals 12 and 13 during each half cycle of the pulsating DC current. For instance, if SCR 14 is swtiched on at the beginning of each half cycle, maximum current is transferred to battery 13. Correspondingly, as the conduction time of SCR 14 is decreased during each half cycle, the charging current to battery 13 is correspondingly decreased.

Control circuitry for controlling the SCR 14 comduction time includes voltage sense comparator 20 and current sense comparator 21. Voltage comparator 20 comprises a differential amplifier having its positive terminal coupled to a reference voltage circuit 22 which provides a constant reference voltage. The negative input of voltage comparator 20 is coupled to battery voltage sense divider 23 coupled across battery 13 which provides the negative input of voltage comparator 20 with charging voltage information.

Current comparator 21 has its negative input coupled to a current sensing resistor 24 which provides a voltage proportional to the charging current. The positive input to current comparator 21 is coupled to a current reference source which provides a constant voltage indicative of a constant current. The output of current comparator 21 is coupled to equalize float switch 25 which varies the voltage sense divider 23 and correspondingly the amount of battery voltage provided voltage comparator 20 in response to the output of current comparator 21.

The output of current comparator 21 is also coupled to low pass filter 27 which filters the output signal of current comparator 21 while still maintaining a sufficient step response and couples current comparator 21 to AND circuit 28. AND circuit 28 is additionally coupled to the output of voltage comprator 20.

AND circuit 28 acts in response to its input signals provided by the voltage comparator and the current comparator to control variable current source 29 to which it is coupled. Variable current source 29 provides a controlled amount of current in response to the voltage and current comparator to control SCR control circuit 30 which in turn controls SCR 14. As more charging current is required, variable current source 29 provides SCR control circuit 30 with a suitable input to cause SCR 14 to conduct for a longer period of time during each half cycle to thereby increase, by a controlled amount, the amount of charging current supplied to battery 13.

The operation of the battery charger of FIG. 1 may best be understood by making reference to FIGS. 2a and 2b of the drawing. When battery 13 is first placed under charge, the battery charging circuit of FIG. 1 operates in a current limit mode which provides a constant maximum current to battery 13. When the voltage across the battery equals a first predetermined voltage magnitude, called the equalize voltage limit, the charging current decreases to maintain the voltage across the battery at the equalize voltage limit. When the battery is fully charged, the current required to maintain the battery at the equalize voltage limit falls below a predetermined limit, called the crossover circuit. The charger then supplies the battery with a constant final voltage called the float voltage to maintain the battery in the fully charged condition.

Referring back to FIG. 1, when battery 13 is connected to terminal 12 and placed under charge, battery voltage sense divider 23 supplies voltage sense comparator 20 at its negative input with battery voltage information which it compares to the voltage supplied by reference voltage circuit 22. Since the battery is just being placed under charge, voltage sense comparator 20 realizes that the voltage across battery 13 is less than the equalized voltage limit, and therefore provides a suitable output to AND circuit 28 indicative of the under voltage condition. Additionally, current comparator 21 having received charging current information from current sensing resistor 24 in relation to the current reference source 26, supplies AND circuit 28 with an input signal which in conjunction with the signal from voltage comparator 28, causes the output of AND circuit 28 to control variable current source 29 in such a way as to cause SCR control circuit 30 to switch SCR 14 on for a time during each half cycle to supply battery 13 with a constant maximum current. While the signal from voltage comparator 20 informs AND circuit 28 that more current is needed to reach the equalize voltage limit, current comparator 21 informs AND circuit 28 to limit the amount of control for variable current source 29 so that the current supplied battery 13 is constant. When the equalize voltage limit is reached, voltage comparator 20 causes AND circuit 28 to inform variable current source 29 that the equalized voltage condition has been reached. More particularly, comparator 20 controls AND circuit 28 with current limit signals so that AND circuit 28 controls variable current source 29 such that SCR control circuit 30 switches SCR 14 so that only the amount of current necessary to maintain the battery at the equalize voltage limit is provided the battery. When the current required to maintain the battery voltage at the equalize limit falls below the crossover current value, the output of current comparator 21 causes equalized float switch 25 to vary the battery voltage sense divider 23 such that voltage comparator 20 compares the reference voltage to a higher battery voltage so that a final constant float voltage is maintained across battery 13 which is lower in magnitude than the first predetermined equalized float voltage. While the float voltage is maintained across battery 13, current comparator 21 provides suitable input information to AND circuit 28 allowing comparator 20 to cause variable current source 29 to provide SCR control circuit 31 with a suitable input to maintain SCR 14 in a conducting condition to provide during each half cycle just enough charging current to maintain the voltage across battery 13 at the float voltage.

As a result, battery 13 is charged in a minimum amount of time because a maximum but limited current is supplied battery 13 until it reaches the equalize voltage, and maintains the equalize voltage across battery 13 until the current required to maintain it decreases to the predetermined limit indicating that the battery is fully charged. The battery is then provided with a float voltage to maintain the battery in a full charged condition. While the battery is charged in a minimum amount of time, because the battery charging conditions are automatically controlled, there is no chance that the battery may be ovecharged, precluding the gassing heretofore mentioned.

Referring now to FIG. 3 which shows the battery charger of FIG. 2 in detailed schematic form, input terminals 10 adapted for connection to an external AC source are coupled to transformer 40 of transformer and rectifying circuit 11. Transformer 40 is center tapped and comprises a full-wave rectifier including diodes 41 and 42. The secondary of transformer 40 is additionally coupled to a local power supply 43 for providing constant voltages for sustaining the operation of the components of the battery charger. Local power supply 43 is of the type well known in the art and therefore will not be further described.

SCR 14 coupled to the junction of diodes 41 and 42 forming a charging source controls the amount of current supplied to battery 13 connected across output terminals 12. The battery charging circuit of FIG. 3 additionally comprises voltage sense comparator 20 including differential amplifier 45 having its positive input 46 resistively coupled to a constant reference potential voltage divider circuit 22 comprising resistors 47, 48 and 49. The constant reference potential is tapped off of variable resistor 48 allowing adjustment of the reference potential. The negative input 50 of differential amplifer 45 is resistively coupled to the output of the battery charger by the battery voltage sensing divider 23 comprising resistors 51, 52 and 53. This provides voltage comparator 20 with battery charging voltage information. Resistor 53 is switchably connected in and out of the voltage divider by equalize float switch 25 including transistor 54. Because the battery voltage information is impressed upon negative input 50, as the voltage across battery 13 increases, the output of differential amplifier 45 becomes more negative. Conversely, as the output voltage of across battery 13 decreases, the output of differential amplifier 45 becomes more positive.

Current sense comparator 21 includes a differential amplifier 55 having its negative input 56 resistively coupled to current sensing resistor 24. Positive input 57 of differential amplifier 55 is coupled to a positive constant voltage source 26 by the divider circuit comprising resistors 59 and 60. Current sensing resistor 24 provides a voltage which is proportional to the charging current. Because the negative terminal is coupled to the sensing resistor, when the output current of the battery charger increases the output siganl of differential amplifier 55 decreases and conversely as the charging current decreases the output correspondingly becomes more positive.

Coupled to the outputs of differential amplifiers 45 and 55 respectively are transistors 61 and 62 which are serially connected forming AND circuit 22. Transistors 61 and 62 are driven by the outputs of differential amplifiers 45 and 55 respectively and acts in reponse to these outputs to provide a suitable control signal to the variable current source 29 comprising transistor 63. Variable current source transistor 63 in response to the input received at its base 64 from the AND circuit, impresses a controlled amount of current onto capacitor 65 included within SCR control circuit 30. The SCR control circuitry also includes a unijunction transistor 66 which, when it conducts, causes the energy stored in capacitor 65 to flow into the primary winding of transformer 67 causing a corresponding output at the secondary of transformer 67 which in turn causes SCR 44 to conduct current during each half cycle. Base terminal 80 of unijunction transistor 66 is coupled to junction 81 of diodes 82 and 83, to receive half cycle timing inputs.

The more current conducted by transistors 63 the sooner capacitor 65 will charge to a suitable voltage for firing unijunction transistor 66. Therefore, if more current is needed to charge battery 13, transistor 63 in response to the AND circuit, will conduct more current, charging capacitor 65 faster to thereby cause unijunction transistor 66 to turn on sonner during each half cycle. Conversely, if less charging current is required, transistor 63 will be made to conduct less current, causing capacitor 65 to charge more slowly causing SCR 14 to conduct for a shorter period of time during each half cycle.

Also coupled to the output of differential amplifier 55 is transistor 68 which is also coupled to equalize float switch 25 comprising transistor 54. Differential amplifier 55, after the current to maintain the charging voltage at the equalize level falls below the crossover current limit, which is programmable by the value of zener diode 69, causes transistor 68 to turn off which in turn switches transistor 54 from the conducting state to the nonconducting state. This, of course, alters the voltage divider utilized by differential amplifier 45. When transistor 54 conducts, resistor 53 is shorted out of sensing divider circuit 23 causing less of the charging voltage to be applied to the negative input of differential amplifier 45. When transistor 54 conducts, the voltage comparator causes the charging circuit to provide the higher equalize voltage while when it is nonconducting, the circuit will seek to provide the lower float voltage.

Transistor 70 coupled to transistor 68 is switched on and off in response to transistor 68 to provide an indication on lamp 71 when the power supply is providing or seeking to provide a voltage across the battery 13 which is equal to the equalize voltage. When transistor 68 is switched on in response to the output of current comparator 55 indicating that the charging current is above the predetermined limit, transistor 70 in response to transistor 68 also conducts which causes lamp 71 to light up to provide the indication.

In operation, a battery 13 to be charged is connected across output terminals 12 and the charger input terminals 10 are connected to an extenal AC source. Because the battery is discharged, differential amplifier senses the maximum charging current. Therefore, a negative output from differential amplifier 55 causes transistor 68 to turn on causing transistor 54 to short resistor 53 out of the voltage sense divider. Because the lesser portion of the charger output voltage will be impressed upon the negative input of differential amplifier 45, the battery charger will seek to supply the equalize voltage across the battery terminals.

In this condition, differential amplifier 45 will produce at its output a positive signal to transistor 61 indicating that the charging voltage at battery 13 is below the equalize voltage. Current comparator differential amplifier 55 on the other hand will produce at its output a voltage which tends to maintain transistor 62 just above cut off in order to limit the current to battery 13 in order to maintain it a constant but maximum charging current. Therefore, the AND circuit 28 comprising transistors 61 and 62 will require transistor 63 to provide a constant current until the equalized voltage is obtained. While transistor 61 is requiring transistor 63 to provide capacitor 65 with as much current as transistor 63 can conduct, transistor 62 in response to differential amplifier 55 tends to limit that current resulting in the constant current limit as shown in FIG. 2a.

When the voltage across battery 13 reaches the equalize voltage limit, or in other words, the maximum charge voltage, the current required to maintain the equalize voltage limit decreases. As the charging current decreases, differential amplifier 55 at its output becomes more positive. In this condition, voltage comparator differential amplifier 45 will tend to almost cut off transistor 61, while transistor 62 is well within its active region. Therefore, the conjoint action of the voltage comparator 20 and current comparator 21 will cause transistor 63 to charge capacitor 65 during each half cycle such that the equalize voltage across battery 13 will be maintained, but at the minimum current required to maintain the equalize voltage. As less current is required to maintain the equalize voltage across battery 13, the current supplied by transistor 63 to capacitor 65 decreases to shorten the conduction time of SCR 14.

When battery 13 is fully charged, the current required to maintain the equalize voltage across its terminals falls to the current crossover limit, at which time, differential amplifier 55 provides transistor 68 with a positive input to turn transistor 68 off which in turn causes transistor 54 to turn off and to resultingly reinsert resistor 53 into voltage sense resistor divider 23. Because differential amplifier 45 is now tapping off a greater portion of the charging output voltage, it will cause the charger to maintain its output voltage at a lower voltage than the equalize voltage. This lower voltage, referred to as the float voltage, is maintained across the battery to sustain its fully charged condition. While the fully charged condition of battery 13 is being maintained, the conjoint action of voltage comparator 20 and current comparator 21 creates input signals to transistors 61 and 62 respectively such that variable current source transistor 63 supplies capacitor 65 with only enough current during each half cycle to maintain the output voltage across battery 13 at the float voltage. In this condition, transistors 61 and 62 are within their active regions, and work together to achieve the float voltage at a minimum current in response to their input signals from voltage comparator 20 and current comparator 21.

When transistor 68 turns off indicating that the battery is fully charged and that the charging circuit should maintain the float voltage across battery 13, transistor 70 also turns off which results in lamp 71 turning off.

The output of differential amplifier 55 is filtered by 2 pole filter 27 consisting of resistor 72, resistor 73, resistor 74, resistor 75, compacitor 77, compacitor 76, and compacitor 78. The filter averages the current sense signal while providing good step response so that should the output terminals 12 be shorted out, the charger will be able to react in a short enough period of time in order to prevent destruction of the charger circuit. In addition, the filtering also provides equal half cycle load sharing.

The battery charger just described may also be utilized as a power supply for an external load while still charging a battery 13. For instance, if an external load is placed across terminals 12 in parallel with the battery under charge, the increased current will be sensed by current comparator 21 so that the proper load current up to the current limit may be provided to the external load. Once the load is disconnected from terminals 12, current comparator 21 senses this condition, and immediately will cause the charging circuit to supply the charging current for only battery 13. For instance, if battery 13 is fully charged and if the external load is disconnected, current comparator 21 will sense the decreased load current causing transistor 68 to turn off thus turning off transistor 54 and interposing resistor 53 back into voltage sensing divider 23 so that the float voltage will be provided.

The present invention provides a battery charger which assures that a battery will be fully charged in a minimum amount of time but yet also assures that gassing within the battery, which may cause its destruction, will not result. When the battery is fully charged, the battery charger automatically provides the float voltage so that the fully charged condition of the battery is maintained. Also, the present invention may be used as an external power supply for external loads while still charging a battery. Additionally, the battery charger of the present invention has the safeguard of being able to detect short circuit output conditions so that the components of the battery charger will not be destroyed.

While particular embodiments of the invention have been shown and described, modifications may be made, and it is intended in the appended claims to cover all such modifications as may fall within the spirit and scope of the invention.

What is claimed is:

1. A battery charging circuit comprising:
   an input adapted for connection to an external power source;
   an output adapted for connection to a battery to be charged;
   a charging source coupled to said output and to said input, and capable of providing said output with a constant charging current and constant charging voltages of first and second predetermined voltage magnitudes at varying charging currents;
   a voltage sensor for sensing the magnitude of the charging voltage at said output and for providing an output voltage having a magnitude dependent upon the charging voltage;
   a current sensor for sensing the mangitude of the charging current at said output and for providing an output voltage having a magnitude dependent upon the charging current;
   an AND gate comprising a pair of serially connected transistors coupled to said voltage sensor and said current sensor for combining said voltage sensor and said current sensor output voltages and for providing a control signal responsive to said combined voltages; and
   means responsive to said control signal for causing said charging source to supply said output with said constant current as long as said charging voltage is less than said first predetermined magnitude, for causing said charging source to supply said output with said constant voltage of said first predetermined magnitude when said charging voltage equals said first predetermined magnitude, and for causing said charging source to supply said output with said charging voltage of said second predetermined magnitude when the current sufficient to maintain said output at said first predetermined voltage magnitude falls below a predetermined limit.

2. A battery charging circuit in accordance with claim 1 where said second predetermined voltage magnitude is less than said first predetermined voltage magnitude.

3. A battery charging circuit in accordance with claim 1 which further comprises an indicator for providing an indication when said constant current and said constant charging voltage of said first predetermined magnitude is supplied.

4. A battery charging circuit in accordance with claim 1 where said voltage sensor comprises a pair of transistors forming a differential amplifier coupled to said output and to a reference potential.

5. A battery charger circuit in accordance with claim 4 where said differential amplifier is coupled to said output through a voltage divider and wherein said battery charger circuit further comprises means for altering said voltage divider in response to said current sensor.

6. A battery charging circuit in accordance with claim 1 wherein said output is coupled to an impedance for creating a voltage indicative of said charging current and where said current sensor comprises a pair of transistors forming a differential amplifier coupled to said output and to a reference potential.

7. A battery charging circuit comprising:
   an input adapted for connection to an external power source;
   an output adapted for connection to a battery to be charged;
   a charging source coupled to said output and to said input, and capable of providing said output with a constant charging current and constant charging voltages of first and second predetermined voltage magnitudes at varying charging currents;

a voltage sensor for sensing the magnitude of the charging voltage at said output;

a current sensor for sensing the magnitude of the charging current at said output; and means including a pair of serially connected transistors forming an AND circuit responsive to said voltage and current sensors for causing said charging source to supply said output with said constant current as long as said charging voltage is less then said first predetermined magnitude, for causing said charging source to supply said output with said constant voltage of said first predetermined magnitude when said charging voltage equals said first predetermined magnitude, and for causing said charging source to supply said output with said charging voltage of said second predetermined magnitude when the current sufficient to maintain said output at said first predetermined voltage magnitude falls below a predetermined limit.

8. A battery charging circuit in accordance with claim 7 which further comprises a variable current source coupled to said AND circuit and to said charging source for controlling said charging source in response to said AND circuit.

9. A battery charging circuit in accordance with claim 1 where said charging source comprises a full wave rectifier coupled to said input and a switching device coupled between said rectifier and said output.

10. A battery charging circuit in accordance with claim 9 where said switching device comprises a silicon controlled rectifier.

11. A battery charging circuit comprising:

an input adapted for connection to an external power source;

an output adapted for connection to a battery to be charged;

a charging source comprising a full wave rectifier coupled to said input and a switching device coupled between said rectifier and said output for providing said output with a constant charging current and constant charging voltages of first and second predetermined voltage magnitudes at varying charging currents, said second predetermined voltage magnitude being less than said first predetermined voltage magnitude;

a voltage sensor including a differential amplifier comprising a pair of transistors coupled to said output for sensing the magnitude of the charging voltage;

a current sensor including a differential amplifier comprising a pair of transistors for sensing the magnitude of the charging current;

a pair of serially coupled transistors, each said transistor coupled to a given one of said sensors, for providing a control signal in response to said sensors;

and means including a variable current source coupled to said serially coupled transistors and to said charging source for causing said charging source in response to said control signals to supply said output with said constant current as long as said charging voltage is less than said first predetermined magnitude, to supply said output with said constant voltage of said first predetermined magnitude when said charging voltage equals said first predetermined magnitude, and to provide said output with said charging voltage of said second predetermined magnitude when the current sufficient to maintain said output at said first predetermined voltage magnitude falls below a predetermined limit.

* * * * *